(12) United States Patent
Stephenson et al.

(10) Patent No.: US 7,372,530 B2
(45) Date of Patent: May 13, 2008

(54) UV CURABLE CONDUCTIVE LAYERS IN LC DISPLAYS

(75) Inventors: Stanley W. Stephenson, Spencerport, NY (US); John I. Kilburn, Hilton, NY (US); Terry J. Martin, Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 289 days.

(21) Appl. No.: 10/845,573

(22) Filed: May 13, 2004

(65) Prior Publication Data

US 2004/0246413 A1 Dec. 9, 2004

Related U.S. Application Data

(63) Continuation-in-part of application No. 10/455,050, filed on Jun. 5, 2003, now Pat. No. 6,950,157.

(51) Int. Cl.
*G02F 1/1334* (2006.01)

(52) U.S. Cl. .......................................... 349/113; 349/86

(58) Field of Classification Search ................. 349/35, 349/86, 139, 142, 185, 113, 122, 138; 438/30; 427/248.1, 411.1; 430/7, 321; 359/253, 359/254

See application file for complete search history.

(56) References Cited

U.S. PATENT DOCUMENTS

| | | | | |
|---|---|---|---|---|
| 3,600,060 A | 8/1971 | Kettering et al. | ............. | 349/21 |
| 3,816,786 A | 6/1974 | Churchill et al. | ............. | 313/486 |
| 4,435,047 A | 3/1984 | Fergason | ............. | 349/86 |
| 5,251,048 A | 10/1993 | Doane et al. | ............. | 345/87 |
| 5,667,853 A * | 9/1997 | Fukuyoshi et al. | ............. | 428/1.62 |
| 5,990,994 A * | 11/1999 | Stephenson | ............. | 349/106 |
| 6,025,952 A * | 2/2000 | Stephenson | ............. | 359/254 |
| 6,043,856 A * | 3/2000 | Stephenson et al. | ............. | 349/86 |
| 6,120,588 A | 9/2000 | Jacobson | ............. | 106/31.16 |
| 6,236,442 B1 | 5/2001 | Stephenson et al. | ............. | 349/142 |
| 6,284,072 B1 * | 9/2001 | Ryan et al. | ............. | 156/59 |
| 6,290,881 B1 * | 9/2001 | Krohn | ............. | 252/600 |
| 6,323,928 B1 | 11/2001 | Petruchik | ............. | 349/142 |
| 6,394,870 B1 | 5/2002 | Petruchik et al. | ............. | 445/24 |
| 6,690,447 B1 * | 2/2004 | Stephenson et al. | ............. | 349/187 |
| 6,784,223 B2 * | 8/2004 | Krohn | ............. | 522/92 |
| 6,811,815 B2 * | 11/2004 | He et al. | ............. | 427/248.1 |
| 6,816,227 B2 * | 11/2004 | Mi et al. | ............. | 349/185 |

(Continued)

FOREIGN PATENT DOCUMENTS

WO  99/36261  7/1999

OTHER PUBLICATIONS

Acheson Product Literature.

(Continued)

*Primary Examiner*—David Nelms
*Assistant Examiner*—Matthew P Lawson
(74) *Attorney, Agent, or Firm*—Akin, Gump, Strauss, Hauer & Feld LLP

(57) ABSTRACT

The present invention relates to a display device comprising a substrate, at least one UV curable conductive layer and an imageable layer. The present invention also relates to a display device comprising a substrate, a first transparent conductive layer, a light modulating layer, and a second conductive layer, wherein the second conductive layer is UV curable.

65 Claims, 9 Drawing Sheets

U.S. PATENT DOCUMENTS

| | | | |
|---|---|---|---|
| 2002/0053320 A1 | 5/2002 | Duthaler et al. | 118/249 |
| 2002/0089625 A1* | 7/2002 | Grupp | 349/110 |
| 2002/0093605 A1* | 7/2002 | Stephenson | 349/86 |
| 2003/0038912 A1* | 2/2003 | Broer et al. | 349/122 |
| 2003/0117548 A1 | 6/2003 | Stephenson | 349/86 |
| 2003/0202136 A1* | 10/2003 | Stephenson et al. | 349/86 |
| 2004/0246411 A1* | 12/2004 | Stephenson et al. | 349/113 |
| 2005/0225703 A1* | 10/2005 | Stephenson et al. | 349/113 |

OTHER PUBLICATIONS

Allied Photochemical Product Literature.

* cited by examiner

UV CURABLE CONDUCTIVE LAYERS IN LC DISPLAYS

CROSS REFERENCE TO RELATED APPLICATIONS

This is a Continuation-In-Part of U.S. patent application Ser. No. 10/455,050 filed Jun. 5, 2003 now U.S. Pat. No. 6,950,157 by Stephenson et al. entitled "Reflective Cholesteric Liquid Crystal Display With Complementary Light-Absorbing Layer".

FIELD OF THE INVENTION

The present invention relates to the use ultraviolet (UV) curable conductive materials in displays. In particular, the invention can be used in polymer dispersed chiral nematic liquid crystal displays on flexible substrates.

BACKGROUND OF THE INVENTION

Currently, information is displayed using assembled sheets of paper carrying permanent inks or displayed on electronically modulated surfaces such as cathode ray displays or liquid crystal displays. Printed information displayed in these manners cannot be changed. Devices that allow for the modification of information, such as electrically updated displays, are often heavy and expensive. Information may also be applied to sheet materials via magnetically written areas, for example, to carry ticketing or financial information. Such magnetically written data, however, is not visible.

Media systems exist that maintain electronically changeable data without power. Such system can be electrophoretic (Eink), Gyricon, or polymer dispersed cholesteric materials. An example of such electronically updateable displays can be found in U.S. Pat. No. 3,600,060, which shows a device having a coated, then dried emulsion of cholesteric liquid crystals in aqueous gelatin to form a field responsive, bistable display. U.S. Pat. No. 3,816,786 also discloses a layer of encapsulated cholesteric liquid crystal responsive to an electric field. The electrodes in the patent can be transparent or nontransparent and formed of various metals or graphite. It is disclosed that one electrode must be light absorbing, and it is suggested that the light absorbing electrode be prepared from paints containing conductive material such as carbon.

Fabrication of flexible, electronically written display sheets is disclosed in U.S. Pat. No. 4,435,047. A substrate carries a first conductive electrode, one or more layers of encapsulated liquid crystals, and a second electrode of electrically conductive ink. The conductive inks form a background for absorbing light, so that the information-bearing display areas appear dark in contrast to background non-display areas. Electrical potential applied to opposing conductive areas operates on the liquid crystal material to expose display areas. Because the liquid crystal material is nematic liquid crystal, the display ceases to present an image when de-energized, that is, in the absence of a field. A first flexible substrate is patterned which is coated. A second pre-patterned substrate is bonded over the coating.

The Fergason patent discloses the use of nematic liquid crystal, which absorbs light and does not maintain an image in the absence of a field. Dyes in either the polymer encapsulant or liquid crystal are used to absorb incident light. The dyes are part of a solution, and not solid submicrometer particles. The patent further discloses the use of a chiral dopant in Example 2. The dopant improves the response time of the nematic liquid crystal, but does not operate in a light reflective state.

U.S. Pat. No. 5,251,048 discloses a light modulating cell having a polymer dispersed chiral nematic liquid crystal. The chiral nematic liquid crystal has the property of being electrically driven between a planar state, reflecting a specific visible wavelength of light, and a focal conic state, transmitting forward scattering light. Chiral nematic liquid crystals, also known as cholesteric liquid crystals, potentially in some circumstances have the capacity of maintaining one of multiple given states in the absence of an electric field. Black paint can be applied to the outer surface of a rear substrate to provide a light absorbing layer forming a non-changing background outside of a changeable display area defined by the intersection of segment lines and scanning lines. A first glass substrate is patterned. A second patterned glass substrate is fixably spaced from the first substrate. The cavity is filled with liquid crystal.

U.S. Pat. No. 6,394,870 discloses directly depositing opaque conductive ink in an image wise pattern by screen printing. A conductor is printed directly over a polymer dispersed cholesteric material. Displays having such a configuration requires a light absorbing backing. The invention creates the light absorber by printing second conductors formed by screen printable carbon in a resin matrix. Carbon absorbs visible light, but also absorbs ultraviolet radiation that can be used to cure ultraviolet responsive conductive formulations. If an ultraviolet cured silver ink were used the reflection of the silver would create negligible contrast between the reflective planar and the transmissive focal conic states. The drying process for opaque conductive inks requires many minutes to cure the ink.

A photocurable silver composition is disclosed in U.S. Pat. No. 6,290,881, which comprises an ultraviolet light curable organic mixture, a photoinitiator, a silver powder, and a silver flake composition. The silver flake composition comprises at least 20% of the weight of the silver powder. The disclosed compositions may be used to produce silver-containing coatings on a variety of different substrates. However, this material is not disclosed for use in display devices.

Cholesteric liquid crystals reflect a portion of the visible spectrum when in a reflective state. It is preferable that the reflective state have neutral color balance. It would be useful to provide cholesteric displays exhibiting neutral density in the reflective state. It would be useful for such display to be fabricated using simple, low cost processes. Such processes should include inexpensive, high speed methods for forming second conductors.

PROBLEM TO BE SOLVED

There remains a need for patterned second conductors over an imaging layer which can be more easily and rapidly cured.

SUMMARY OF THE INVENTION

The present invention relates to a display device comprising a substrate, at least one UV curable conductive layer and an imageable layer. The present invention also relates to a display device comprising a substrate, a first transparent conductive layer, a light modulating layer, and a second conductive layer, wherein the second conductive layer is UV curable.

ADVANTAGEOUS EFFECT OF THE INVENTION

The present invention includes several advantages, not all of which are incorporated in a single embodiment. Ultraviolet curing of silver ink permits high speed fabrication and curing of printed second conductors. A dark layer permits the use of such a process with polymer dispersed cholesteric materials. Replacing silver content in the ink reduces the cost of the printed material.

DETAILED DESCRIPTION OF THE INVENTION

Figure 1:
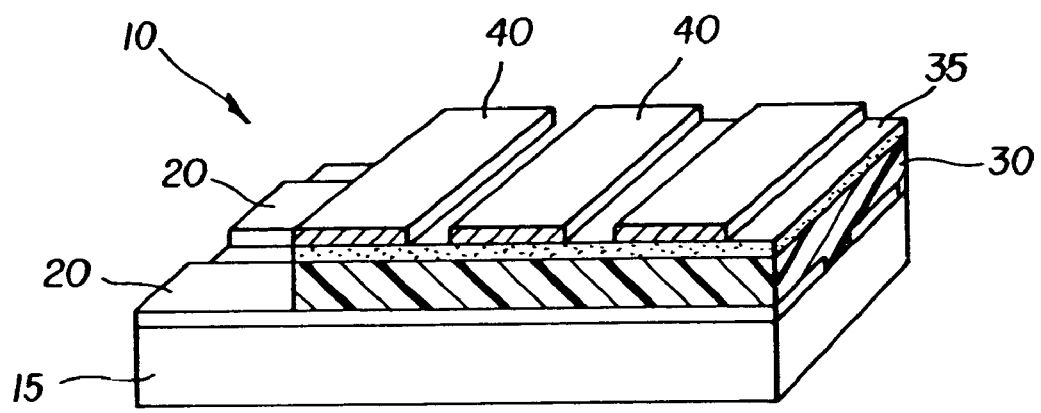
FIG. 1 is a perspective section view of a first polymer dispersed cholesteric liquid crystal display in accordance with the present invention.

As used herein, the phase a "liquid crystal display" (LCD) is a type of flat panel display used in various electronic devices. At a minimum, an LCD comprises a substrate, at least one conductive layer and a liquid crystal layer. LCDs may also comprise two sheets of polarizing material with a liquid crystal solution between the polarizing sheets. The sheets of polarizing material may comprise a substrate of glass or transparent plastic.

The liquid crystal (LC) is used as an optical switch. The substrates are usually manufactured with transparent, conductive electrodes, in which electrical "driving" signals are coupled. The driving signals induce an electric field which can cause a phase change or state change in the LC material, the LC exhibiting different light reflecting characteristics according to its phase and/or state.

In the present invention, curable materials are applied to the support. The curable material may comprise any material that is curable and may be applied to form a coating. This may include materials that require some chemical mechanism, such as crosslinking, to cure as well as evaporation of a carrier solvent. In one embodiment, the curable material may comprise a polymeric material. Coatings may include, but are not limited to, imageable layers, light modulating layers, conductive layers, color contrast layers, dielectric layers, and barrier layers. The curable material may be directly applied to the substrate or it may be applied with a carrier material that may be later removed to facilitate the curing process, such as a solvent.

The curable materials may be applied to the support by any method known by those of skill in the art to form a layer. Some exemplary methods may include screen printing, hopper coating, gravure printing, lithographic and photolithographic printing, spraying, and vapor depositing.

In one embodiment, at least one imageable layer is applied to the support. The imageable layer may contain an electrically imageable material. The electrically imageable material may be light emitting or light modulating. Light emitting materials may be inorganic or organic in nature. Particularly preferred are organic light emitting diodes (OLED) or polymeric light emitting diodes (PLED). The light modulating material may be reflective or transmissive. Light modulating materials may be electrochemical, electrophoretic, such as Gyricon particles, electrochromic, or liquid crystals. The liquid crystalline material may be twisted nematic (TN), super twisted nematic (STN), ferroelectric, magnetic, or chiral nematic liquid crystals. Especially preferred are chiral nematic liquid crystals. The chiral nematic liquid crystals may be polymer dispersed liquid crystals (PDLC). Structures having stacked imaging layers or multiple support layers, however, are optional for providing additional advantages in some case.

In a preferred embodiment, the electrically imageable material can be addressed with an electric field and then retain its image after the electric field is removed, a property typically referred to as "bistable". Particularly suitable electrically imageable materials that exhibit "bistability" are electrochemical, electrophoretic, such as Gyricon particles, electrochromic, magnetic, or chiral nematic liquid crystals. Especially preferred are chiral nematic liquid crystals. The chiral nematic liquid crystals may be polymer dispersed liquid crystals (PDLC).

Most preferred is a support bearing a conventional polymer dispersed light modulating material. The liquid crystal (LC) is used as an optical switch. The supports are usually manufactured with transparent, conductive electrodes, in which electrical "driving" signals are coupled. The driving signals induce an electric field which can cause a phase change or state change in the LC material, the LC exhibiting different light reflecting characteristics according to its phase and/or state.

Liquid crystals may be nematic (N), chiral nematic (N*), or smectic, depending upon the arrangement of the molecules in the mesophase. Chiral nematic liquid crystal refers to the type of liquid crystal having finer pitch than that of twisted nematic and super twisted nematic. Chiral nematic liquid crystals are so named because such liquid crystal formulations are commonly obtained by adding chiral agents to host nematic liquid crystals. Chiral nematic liquid crystals may be used to provide bistable and multistable reflective displays that, due to their nonvolatile "memory" characteristic, do not require a continuous driving circuit to maintain a display image, thereby significantly reducing power consumption. Chiral nematic displays are bistable in the absence of a field, the two stable textures being the reflective planar texture and the weakly scattering focal conic texture. In the planar texture, the helical axes of the chiral nematic liquid crystal molecules are substantially parallel to the support upon which the liquid crystal is disposed. In the focal conic state, the helical axes of the liquid crystal molecules are generally randomly oriented. By adjusting the concentration of chiral dopants in the chiral nematic material, the pitch length of the molecules and, thus, the wavelength of radiation that they will reflect, may be adjusted. Chiral nematic materials that reflect infrared radiation have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference.

There are alternative display technologies to LCDs that may be used, for example, in flat panel displays. A notable example is organic or polymer light emitting devices, (OLEDs) or (PLEDs), which are comprised of several layers in which one of the layers is an organic material that can be made to electroluminesce by applying a voltage across the device. An OLED device is typically a laminate formed in a substrate such as glass or a plastic polymer. A light emitting layer of a luminescent organic solid, as well as adjacent semiconductor layers, are sandwiched between an anode and a cathode. The semiconductor layers may be hole injecting and electron injecting layers. PLEDs may be considered a subspecies of OLEDs in which the luminescent organic material is a polymer. The light emitting layers may be selected from any of a multitude of light emitting organic solids, e.g., polymers that are suitably fluorescent or chemiluminescent organic compounds. Such compounds and polymers include metal ion salts of 8-hydroxyquinolate, trivalent metal quinolate complexes, trivalent metal bridged quinolate complexes, Schiff-based divalent metal complexes, tin (IV) metal complexes, metal acetylacetonate complexes, metal bidenate ligand complexes incorporating organic ligands, such as 2-picolylketones, 2-quinaldylketones, or 2-(o-phenoxy) pyridine ketones, bisphosphonates, divalent metal maleonitriledithiolate complexes, molecular charge transfer complexes, rare earth mixed chelates, (5-hydroxy) quinoxaline metal complexes, aluminum tris-quinolates, and polymers such as poly(p-phenylenevinylene), poly(dialkoxyphenylenevinylene), poly(thiophene), poly(fluorene), poly(phenylene), poly(phenylacetylene), poly(aniline), poly(3-alkylthiophene), poly(3-octylthiophene), and poly(N-vinylcarbazole). When a potential difference is applied across the cathode and anode, electrons from the electron injecting layer and holes from the hole injecting layer are injected into the light emitting layer; they recombine, emitting light. OLEDs and PLEDs are described in the following United States patents, all of which are incorporated herein by this reference: U.S. Pat. No. 5,707,745 to Forrest et al., U.S. Pat. No. 5,721,160 to Forrest et al., U.S. Pat. No. 5,757,026 to Forrest et al., U.S. Pat. No. 5,834,893 to Bulovic et al., U.S. Pat. No. 5,861,219 to Thompson et al., U.S. Pat. No. 5,904,916 to Tang et al., U.S. Pat. No. 5,986,401 to Thompson et al., U.S. Pat. No. 5,998,803 to Forrest et al., U.S. Pat. No. 6,013,538 to Burrows et al., U.S. Pat. No. 6,046,543 to Bulovic et al., U.S. Pat. No. 6,048,573 to Tang et al., U.S. Pat. No. 6,048,630 to Burrows et al., U.S. Pat. No. 6,066,357 to Tang et al., U.S. Pat. No. 6,125,226 to Forrest et al., U.S. Pat. No. 6,137,223 to Hung et al., U.S. Pat. No. 6,242,115 to Thompson et al., and U.S. Pat. No. 6,274,980 to Burrows et al.

In a typical matrix address light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode may be formed over the electrode layers. For example, in U.S. Pat. No. 5,703,436 to Forrest et al., incorporated herein by reference, transparent indium tin oxide (ITO) is used as the hole injecting electrode, and a Mg—Ag—ITO electrode layer is used for electron injection.

Modern chiral nematic liquid crystal materials usually include at least one nematic host combined with a chiral dopant. Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length.

Chiral nematic liquid crystal materials and cells, as well as polymer stabilized chiral nematic liquid crystals and cells, are well known in the art and described in, for example, U.S. Pat. No. 5,695,682, U.S. application Ser. No. 07/969,093, Ser. No. 08/057,662, Yang et al., Appl. Phys. Lett. 60(25) pp 3102-04 (1992), Yang et al., J. Appl. Phys. 76(2) pp 1331 (1994), published International Patent Application No. PCT/US92/09367, and published International Patent Application No. PCT/US92/03504, all of which are incorporated herein by reference.

Suitable commercial nematic liquid crystals include, for example, E7, E48, E44, E31, E80, TL202, TL203, TL204 and TL205 manufactured by E. Merck. The chiral nematic material may comprise, for example, one or more of the following materials obtained from Merck Ltd.: BL061, BL100, BL10, BL087, BL118, and BL036. Although nematic liquid crystals having positive dielectric anisotropy, and, especially cyanobiphenyls, are preferred, virtually any nematic liquid crystal known in the art, including those having negative dielectric anisotropy, may be suitable for use in the invention. Chiral nematic liquid crystal materials may be Merck BL112, BL126, BL-03, BL-048 or BL-033, which are available from EM Industries of Hawthorne, N.Y. Other suitable materials may include ZLI-3308, ZLI-3273, ZLI-5048-000, ZLI-5049-100, ZLI-5100-100, ZLI-5800-000 and MLC-6041-100. Other light reflecting or diffusing modulating, electrically operated materials may also be coated, such as a microencapsulated electrophoretic material in oil. Examples of nematic hosts are mixtures containing 5CB or MBBA.

The present invention may employ, as a light modulating layer, chiral nematic liquid crystal compositions dispersed in a continuous matrix. Such materials are referred to as "polymer dispersed liquid crystal" materials or "PDLC" materials. Such materials may be made by a variety of methods. For example, Doane et al. (Applied Physics Letters 48, 269 (1986)) disclose a PDLC comprising approximately 0.4 mm droplets of nematic liquid crystal 5CB in a polymer binder, incorporated herein by reference. A phase separation method is used for preparing the PDLC. A solution containing monomer and liquid crystal is filled in a display cell and the material is then polymerized. Upon polymerization, the liquid crystal becomes immiscible and nucleates to form droplets. West et al. (Applied Physics Letters 63, 1471 (1993)), incorporated herein by reference, disclose a PDLC comprising a chiral nematic mixture in a polymer binder. Once again a phase separation method is used for preparing the PDLC. The liquid crystal material and polymer (a hydroxy functionalized polymethylmethacrylate) along with a crosslinker for the polymer are dissolved in a common organic solvent toluene and coated on an indium tin oxide (ITO) support. A dispersion of the liquid crystal material in the polymer binder is formed upon evaporation of toluene at high temperature.

The liquid crystalline material may be made by methods known to those of skill in the art, such as an emulsification method or a phase separation method. In a preferred embodiment, the liquid crystalline material may be fabricated using limited coalescence processing to form uniformly sized emulsions of liquid crystalline material. Such methods are disclosed in U.S. patent application Ser. No. 10/095,379, hereby incorporated by reference in its entirety. This may be done by homogenizing the liquid crystalline material in the presence of finely divided silica, and a coalescence limiting material, such as LUDOX from duPont Corporation. A promoter material may be added to the aqueous bath to drive the colloidal particles to the liquid-liquid interface. In a preferred embodiment, a copolymer of adipic acid and 2-(methylamino) ethanol may be used as the promoting agent in the water bath. The liquid crystal material may be dispersed using ultrasound to create liquid crystal domains below 1 micron in size. When the ultrasound energy is removed, the liquid crystal material coalesced into domains of uniform size. The ratio of smallest to largest domain size preferably varies by approximately 1:2. By varying the amount of silica and copolymer relative to the liquid crystalline material, uniform domain size emulsions of average diameters of approximately 1, 3, and, 8 microns may be produced, as determined by microscopy. These emulsions may be diluted in gelatin solution for subsequent coating.

Preferably, the domains are flattened spheres and have, on average, a thickness substantially less than their length, preferably at least 50% less. More preferably, the domains on average have a thickness (depth) to length ratio of 1:2 to 1:6. The flattening of the domains may be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material may be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

In a preferred embodiment, the contrast of the display is maximized by the use of only a substantial monolayer of N*LC domains. The term "substantial monolayer" is defined herein to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display.

In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. In practice, there may be imperfections in which gaps occur and some unevenness due to overlapping droplets or domains. On this basis, the calculated amount is preferably less than 150 percent of the amount needed for monolayer domain coverage, preferably not more than 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

The liquid crystalline layer or layers may also contain other ingredients. For example, while color is introduced by the liquid crystal material itself, pleochroic dyes may be added to intensify or vary the color reflected by the cell. Similarly, additives such as fumed silica may be dissolved in the liquid crystal mixture to adjust the stability of the various chiral nematic textures. A dye in an amount ranging from 0.25% to 1.5% may also be used.

At least one conductive layer may be utilized with the present invention. Preferably, at least one of the conductive layers is UV curable. The UV curable conductive layer may be used in combination with conductive materials which are not UV curable. In other embodiments, multiple conductive layers may be UV curable.

For higher conductivities, the conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd).

In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation, incorporated herein by reference. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference. The UV curable conductive layer may also be applied as a layer of silver coated on one or both sides with a thinner layer of metal.

The conductive layer may be formed in a vacuum environment using materials such as aluminum, tin, silver, platinum, carbon, tungsten, molybdenum, or indium. Oxides of these metals may be used to darken patternable conductive layers. The metal material may be excited by energy from resistance heating, cathodic arc, electron beam, sputtering or magnetron excitation. The conductive layer may comprise coatings of tin-oxide or indium-tin oxide, resulting in the layer being transparent. There may also be more than one conductive layer.

A suitable material may include electrically modulated material disposed on a suitable support structure, such as on or between one or more electrodes. The term "electrically modulated material" as used herein is intended to include any suitable nonvolatile material. Suitable materials for the electrically modulated material are described in U.S. patent application Ser. No. 09/393,553 and U.S. Provisional Patent Application Ser. No. 60/099,888, the contents of both applications are herein incorporated by reference.

The electrically modulated material may also be a printable, conductive ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from 30 to 300 microns. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid-filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. No. 6,147,791, U.S. Pat. No. 4,126,854 and U.S. Pat. No. 6,055,091, the contents of which are herein incorporated by reference.

According to one practice, the microcapsules may be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles may have different types of color and charge polarity. For example white positively charged particles may be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material. According to a preferred embodiment, the particle diameters of the microcapsules are between 5 microns and 200 microns, and the particle diameters of the charged particles are between one-thousandth and one-fifth the size of the particle diameters of the microcapsules.

Further, the electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through the rewritable material.

The electrically modulated material may also include surface stabilized ferroelectric liquid crystals (SSFLC). Surface stabilized ferroelectric liquid crystals confine ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material display material may have different properties or colors. Moreover, the characteristics of the various layers may be different from each other. For example, one layer may be used to view or display information in the visible light range, while a second layer responds to or emits ultraviolet light. The nonvisible layers may alternatively be constructed of non-electrically modulated materials that have radiation absorbing or emitting characteristics. The electrically modulated material employed in connection with the present invention preferably has the characteristic that it does not require power to maintain display of indicia.

The curable layer may comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged.

The dielectric material may form an adhesive layer to subsequently bond a second electrode to the light modulating layer. Conventional lamination techniques involving heat and pressure are employed to achieve a permanent durable bond. Certain thermoplastic polyesters, such as VITEL 1200 and 3200 resins from Bostik Corp., polyurethanes, such as MORTHANE CA-100 from Morton International, polyamides, such as UNIREZ 2215 from Union Camp Corp., polyvinyl butyral, such as BUTVAR B-76 from Monsanto, and poly(butyl methacrylate), such as ELVAC- ITE 2044 from ICI Acrylics Inc. may also provide a substantial bond between the electrically conductive and light modulating layers.

The dielectric adhesive layer may be coated from common organic solvents at a dry thickness of 1 to 3 microns. The dielectric adhesive layer may also be coated from an aqueous solution or dispersion. Polyvinyl alcohol, such as AIRVOL 425 or MM-51 from Air Products, poly(acrylic acid), and poly(methyl vinyl ether/maleic anhydride), such as GANTREZ AN-119 from GAF Corp. can be dissolved in water, subsequently coated over the second electrode, dried to a thickness of 1 to 3 microns and laminated to the light modulating layer. Aqueous dispersions of certain polyamides, such as MICROMID 142LTL from Arizona Chemical, polyesters, such as AQ 29D from Eastman Chemical Products Inc., styrene/butadiene copolymers, such as TYLAC 68219-00 from Reichhold Chemicals, and acrylic/styrene copolymers such as RayTech 49 and RayKote 234L from Specialty Polymers Inc. can also be utilized as a dielectric adhesive layer as previously described.

The curing process may occur by any means known to those of skill in the art of curing coatings, such as through application of light, heat, airflow, chemical reaction, or some other source of energy. Light activation of the curing process may occur through exposure to ultraviolet, visible, infrared light, or combinations thereof, which then initiates a chemical reaction to cure the materials, such as through crosslinking polymerizations.

The typical curing process takes place in several steps: (a) initiation, (b) machine conveyance curing, and (c) wound roll curing. There are two primary methods to cure the coatings: actinic and thermal. In actinic curing, polymerization of prepolymeric inks with less than 10% volatiles is initiated by the application of electromagnetic energy. UV wavelengths at less than 386 nanometers is used for this process. Dosage limits are 100 to 700 $mJ/cm^2$ with 300 to 500 $mJ/cm^2$ preferred. Temperature and air flow are standard for one skilled in the art. Machine curing does not substantially take place in UV curing; however, additional time is required to fully complete the process. In the wound roll, the web requires time without lap-to-lap contact to fully cure. Temperature limits are 10 to 100 with 20 to 30° C. preferred, humidity limits are 0 to 90% with 40 to 60% preferred, and air flow limits are 0 to 4000 fpm with 0 to 15 fpm preferred. The presence of any of a number of gases is useful to the process with air or nitrogen being preferred.

Thermally curable solvent coatings rely on diffusion and convection to drive off volatiles that may be up to 75% of the total coating. Initiation and conveyance curing take place by the application of elevated temperature gas moving along or across the web. Air conveyed technology is well known and standard practices exist for these processes. In the wound roll, drying does not usually continue; however, when the layers are spaced so that lap-to-lap contact does not take place, drying can continue. Temperature limits are 20 to 100° C. with 70 to 90° C. preferred, humidity limits are 20 to 60% with 30 to 50% preferred, and airflow limits are 0 to 4000 fpm with 0 to 15 fpm preferred.

Liquid crystals may be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxylic acid and of cyclohexylcyclohexanecarboxylic acid; phenyl cyclohexanes; cyclohexylbiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyldioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, may be characterized by the following formula R'-X-Y-Z-R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc-; wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl) ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2—CH2—, —CO—O—, —CH2—O—, —CO—S—, —CH2—S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, may be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, *Mol. Cryst. Liq. Crys.*, 123, 377 (1985); G. Spada and G. Proni, *Enantiomer*, 3, 301 (1998) and references therein, incorporated herein by reference. Typical well known dopant classes include 1,1-binaphthol derivatives; isosorbide (D-1) and similar isomannide esters as disclosed in U.S. Pat. No. 6,217,792, incorporated herein by reference; TADDOL derivatives (D-2) as disclosed in U.S. Pat. No. 6,099,751, incorporated herein by reference; and the pending spiroindanes esters (D-3) as disclosed in U.S. patent application Ser. No. 10/651,692 by T. Welter et al., filed Aug. 29, 2003, titled "Chiral Compounds And Compositions Containing The Same," hereby incorporated by reference.

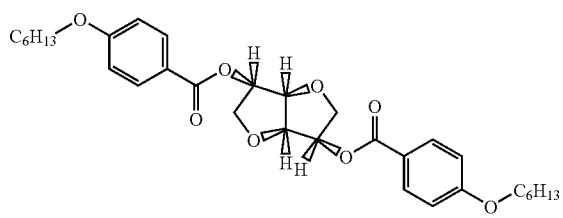

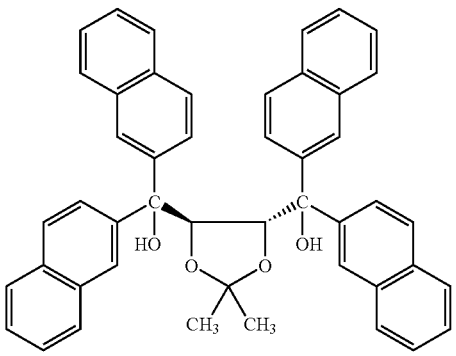

-continued

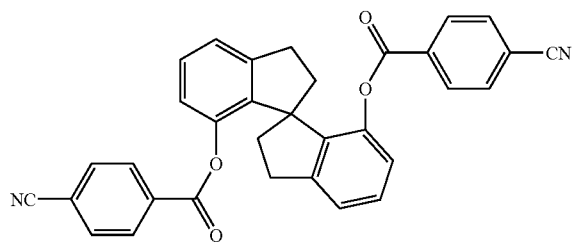

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983, incorporated herein by reference. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP \cdot c)$$

where c is the concentration of the chiral dopant and HTP is the proportionality constant.

For some applications, it is desired to have LC mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays.

Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

Chiral nematic liquid crystal materials and cells, as well as polymer stabilized chiral nematic liquid crystals and cells, are well known in the art and described in, for example, U.S. patent application Ser. No. 07/969,093; Ser. No. 08/057,662; Yang et al., Appl. Phys. Lett. 60(25) pp 3102-04 (1992); Yang et al., J. Appl. Phys. 76(2) pp 1331 (1994); published International Patent Application No. PCT/US92/09367; and published International Patent Application No. PCT/US92/03504, all of which are incorporated herein by reference.

In a preferred embodiment, a light modulating layer is deposited over a first conductor. The light modulating layer contains a chiral nematic liquid crystal. The selected material preferably exhibits high optical and electrical anisotropy and matches the index of refraction of the carrier polymer, when the material is electrically oriented. Examples of such materials are E. Merck's BL-03, BL-048 or BL-033, which are available from EM Industries of Hawthorne, N.Y. Other light reflecting or diffusing modulating, electrically operated materials may also be coated, such as a microencapsulated electrophoretic material in oil.

The liquid crystal may be a chiral doped nematic liquid crystal, also known as cholesteric liquid crystal, such as those disclosed in U.S. Pat. No. 5,695,682. Application of fields of various intensity and duration change the state of chiral doped nematic materials from a reflective to a transmissive state. These materials have the advantage of maintaining a given state indefinitely after the field is removed. Cholesteric liquid crystal materials may be Merck BL112, BL118 or BL126 that are available from EM Industries of Hawthorne, N.Y. The light modulating layer is effective in two conditions.

The flexible plastic substrate may be any flexible self supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least 200° C., some up to 3000-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly (ether ether ketone) (PEEK), poly(ether ketone) (PEK), poly(ethylene tetrafluoroethylene)fluoropolymer (PETFE), and poly(methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. Alternatively, the flexible plastic substrate may be a polyester. A preferred polyester is an aromatic polyester such as Arylite. Although various examples of plastic substrates are set forth above, it should be appreciated that the substrate may also be formed from other materials such as glass and quartz.

The flexible plastic substrate may be reinforced with a hard coating. Typically, the hard coating is an acrylic coating. Such a hard coating typically has a thickness of from 1 to 15 microns, preferably from 2 to 4 microns and may be provided by free radical polymerization, initiated either thermally or by ultraviolet radiation, of an appropriate polymerizable material. Depending on the substrate, different hard coatings may be used. When the substrate is polyester or Arton, a particularly preferred hard coating is the coating known as "Lintec". Lintec contains UV cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

In one embodiment, a sheet supports a conventional polymer dispersed light modulating material. The sheet includes a substrate. The substrate may be made of a polymeric material, such as Kodak Estar film base formed of polyester plastic, and have a thickness of between 20 and 200 microns. For example, the substrate may be an 80 micron thick sheet of transparent polyester. Other polymers, such as transparent polycarbonate, may also be used. Alternatively, the substrate 15 may be thin, transparent glass.

The LCD contains at least one transparent conductive layer, which typically is comprised of a primary metal oxide. This conductive layer may comprise other metal oxides such as indium oxide, hafnium oxide, titanium dioxide, cadmium oxide, gallium indium oxide, niobium pentoxide and tin dioxide. See, Int. Publ. No. WO 99/36261 by Polaroid Corporation, incorporated herein by reference. In addition to the primary oxide such as ITO, the at least one conductive layer may also comprise a secondary metal oxide such as an oxide of cerium, titanium, zirconium, and/or tantalum. See, U.S. Pat. No. 5,667,853 to Fukuyoshi et al. (Toppan Printing Co.), incorporated herein by reference. Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin-oxide or indium-tin-oxide (ITO), or polythiophene, with ITO being the preferred material. Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal may be a metal oxide to create a light absorbing conductive layer.

Indium tin oxide (ITO) is the preferred conductive material, as it is a cost effective conductor with good environmental stability, up to 90% transmission, and down to 20 ohms per square resistivity. An exemplary preferred ITO layer has a % transmittance (% T) greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10-120 nm in thickness, or 50-100 nm thick to achieve a resistivity of 20-60 ohms/square on plastic. An exemplary preferred ITO layer is 60-80 nm thick.

The conductive layer is preferably patterned. The conductive layer is preferably patterned into a plurality of electrodes. The patterned electrodes may be used to form a LCD device. In another embodiment, two conductive substrates are positioned facing each other and cholesteric liquid crystals are positioned therebetween to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals may be used to darken patternable conductive layers. The metal material may be excited by energy from resistance heating, cathodic arc, electron beam, sputtering or magnetron excitation. The second conductive layer may comprise coatings of tin-oxide or indium-tin oxide, resulting in the layer being transparent. Alternatively, second conductive layer may be printed conductive ink.

For higher conductivities, the second conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infra red (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

The LCD may also comprises at least one "functional layer" between the conductive layer and the substrate. The functional layer may comprise a protective layer or a barrier layer. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. Since the liquid crystal are switched between states by voltage, charge accumulation of sufficient voltage on the web surface may create an electrical field that when discharged may switch a portion of the liquid crystal. It is well know in the art of photographic web based materials that winding, conveying, slitting, chopping and finishing can cause charge build on many web based substrates. High charge buildup is a particular problem with plastic webs that are conductive on one side but not on the other side. Charges accumulates on one side on the web to the point of discharge and in photographic light sensitive materials that discharge can result in fog which is uncontrolled light exposure as a result of the spark caused from the discharge. Similar precaution and static management is necessary during manufacturing or in end use applications for liquid crystal displays. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

One type of functional layer may be a color contrast layer. Color contrast layers may be radiation reflective layers or radiation absorbing layers. Preferably the radiation reflected or absorbed is light radiation. In some cases, the rearmost substrate of each display may preferably be painted black. The black paint absorbs infrared radiation that reaches the back of the display. In the case of the stacked cell display, the contrast may be improved by painting the back substrate of the last visible cell black. The paint is preferably transparent to infrared radiation. This effectively provides the visible cell with a black background that improves its contrast, and yet, does not alter the viewing characteristics of the infrared display. Paint such as black paint, which is transparent in the infrared region, is known to those skilled in the art. For example, many types of black paint used to print the letters on computer keys are transparent to infrared radiation. In one embodiment, a light absorber may be positioned on the side opposing the incident light. In the fully evolved focal conic state, the chiral nematic liquid crystal is transparent, passing incident light, which is absorbed by the light absorber to create a black image. Progressive evolution of the focal conic state causes a viewer to perceive a reflected light that transitions to black as the chiral nematic material changes from planar state to a focal conic state. The transition to the light transmitting state is progressive, and varying the low voltage time permits variable levels of reflection. These variable levels may be mapped out to corresponding gray levels, and when the field is removed, the light modulating layer maintains a given optical state indefinitely. This process is more fully discussed in U.S. Pat. No. 5,437,811, incorporated herein by reference.

The color contrast layer may also be other colors. In another embodiment, the dark layer comprises milled nonconductive pigments. The materials are milled below 1 micron to form "nano-pigments". Such pigments are effective in absorbing wavelengths of light in very thin or "sub micron" layers. In a preferred embodiment, the dark layer absorbs all wavelengths of light across the visible light spectrum, that is from 400 nanometers to 700 nanometers wavelength. The dark layer may also contain a set or multiple pigment dispersions. For example, three different pigments, such as a Yellow pigment milled to median diameter of 120 nanometers, a magenta pigment milled to a median diameter of 210 nanometers, and a cyan pigment, such as Sunfast® Blue Pigment 15:4 pigment, milled to a median diameter of 110 nanometers are combined. A mixture of these three pigments produces a uniform light absorption across the visible spectrum. Suitable pigments are readily available and are designed to be light absorbing across the visible spectrum. In addition, suitable pigments are inert and do not carry electrical fields.

Suitable pigments used in the color contrast layer may be any colored materials, which are practically insoluble in the medium in which they are incorporated. The preferred pigments are organic in which carbon is bonded to hydrogen atoms and at least one other element such as nitrogen, oxygen and/or transition metals. The hue of the organic pigment is primarily defined by the presence of one or more chromophores, a system of conjugated double bonds in the molecule, which is responsible for the absorption of visible light. Suitable pigments include those described in Industrial Organic Pigments: Production, Properties, Applications by W. Herbst and K. Hunger, 1993, Wiley Publishers, incorporated herein by reference. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine, triarylcarbonium and quinophthalone. The color of the layer may be adjusted to produce a particular result when combined with the absorption/reflection wavelengths of the liquid crystalline material. This may be referred to as a complementary color contrast layer.

The protective layer useful in the practice of the invention may be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants.

The liquid crystalline material may preferably be fabricated using limited coalescence processing to form uniformly sized emulsions of liquid crystalline material. This may be done by homogenizing the liquid crystalline material in the presence of finely divided silica, a coalescence limiting material, such as LUDOX from duPont Corporation. A promoter material may be added to the aqueous bath to drive the colloidal particles to the liquid-liquid interface. In a preferred embodiment, a copolymer of adipic acid and 2-(methylamino) ethanol may be used as the promoting agent in the water bath. The liquid crystal material may be dispersed using ultrasound to create liquid crystal domains below 1 micron in size. When the ultrasound energy is removed, the liquid crystal material coalesced into domains of uniform size. The ratio of smallest to largest domain size preferably varies by approximately 1:2. By varying the amount of silica and copolymer relative to the liquid crystalline material, uniform domain size emulsions of average diameters of approximately 1, 3, and, 8 micron may be produced, as determined by microscopy. These emulsions may be diluted in gelatin solution for subsequent coating.

The control of the droplet size of liquid crystals is extremely difficult because of the nature of such materials to continuously coalesce into ever increasing size droplets until a single phase results. In the preparation of photographic elements containing a layer having therein liquid crystal droplets, it has been found that the size of the liquid crystal droplets and the uniformity of the droplets size is a desirable parameter with regard to the quality of the photographic image, and the scratch resistance of the photographic element when it comes in contact with other parts of the apparatus in which it is employed, such as, cameras, photo processes apparatus, and the like. A particular embodiment of this is set forth in previously mentioned copending U.S. Pat. No. 5,529,891, incorporated herein by reference.

The liquid crystal droplets as described herein are prepared by forming a discontinuous phase of liquid crystal droplets in a continuous aqueous phase containing a particulate suspension stabilizing agent, reducing the size of the liquid crystal droplets and limiting the coalescence of the droplets by the action of the particulate suspension stabilizing agent on the surface of the droplets.

In one embodiment, the liquid crystal droplets may be made by a limited coalescence process wherein the liquid crystal is dissolved in a suitable solvent therefore, which solvent is removed by evaporation after the size of the droplets have been established by limiting the coalescence thereof. In a second embodiment, a permanent solvent may be mixed with the liquid crystal. This mixture may be dispersed in an aqueous medium and the size of the droplets by limiting the coalescence by the action of the suspension stabilizing agent. The permanent solvent, which has a higher surface energy remains in the droplet, thus avoiding the evaporation step as in the procedure outlined above. Either of these methods give narrow particle size distribution with the mean particle size of the droplets being controlled by the amount of the particulate suspension stabilizing agent employed in the preparation of the dispersion. Thus, the particular liquid crystal employed may be generally mixed with either the volatile solvent or with the permanent solvent and then dispersed in an aqueous medium containing the particulate suspension stabilizing agent and a promoter, the purpose of which is to drive the particulate suspension stabilizing agent to the interface between the liquid crystal droplet and the water medium. The dispersion of liquid crystal droplets in the aqueous medium may be vigorously mixed by any suitable device including high speed agitation, ultrasonic devices, and homogenizers, in order to reduce the particle size of the liquid crystal droplets to less than that ultimately desired. The presence of the particulate suspension stabilizer then controls the level of coalescence that takes place until an equilibrium is reached and the particle size does not grow any farther. In the preparation including the volatile solvent, the solvent may then be driven off by raising the temperature to above the volatilization temperature of the solvent. The droplets may be employed in the preparation of a coating composition for use in the preparation of an imaging element. In the case using a permanent solvent, the droplets including the permanent solvent are used directly in the preparation of the coating composition.

In order to provide suitable formulations for applying a layer containing the liquid crystal droplets, the dispersions prepared by either of the methods described above, are combined with a hydrophilic colloid, gelatin being the preferred material. Surfactants may be included with the liquid crystal dispersion prior to the addition of gelatin in order to prevent the removal of the particulate suspension stabilizing agent from the liquid crystal droplets. This aids in preventing further coalescence of the liquid crystal droplets.

As for the suspension stabilizing agents that surround the lubricating properties and which serve to prevent the coalescence of the liquid crystal droplets, any suitable colloidal stabilizing agent known in the art of forming polymeric particles by the addition reaction of ethylenically unsaturated monomers by the limited coalescence technique may be employed, such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; copolymers such as copoly(styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent.

Suitable promoters to drive the suspension stabilizing agent to the interface of the liquid crystal droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water soluble complex resinous amine condensation products, such as the water soluble condensation product of diethanol amine and adipic acid, such as poly(adipic acid-co-methylaminoethanol), water soluble condensation products of ethylene oxide, urea, and formaldehyde and polyethyleneimine; gelatin, glue, casein, albumin, gluten, and methoxycellulose. The preferred promoter is triethylphenyl ammonium chloride.

In order to prevent the hydrophilic colloid from removing the suspension stabilizing agent from the surface of the liquid crystal droplets, suitable anionic surfactants may be included in the mixing step to prepare the coating composition such as polyisopropyl naphthalene-sodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

Suitable hydrophilic binders include both naturally occurring substances such as proteins, protein derivatives, cellulose derivatives (e.g. cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

In one embodiment, a liquid crystal material is dispersed an aqueous bath containing a water soluble binder material such as deionized gelatin, polyvinyl alcohol (PVA) or polyethylene oxide (PEO). Such compounds are machine coatable on equipment associated with photographic films. It is desirable that the binder have a low ionic content. The presence of ions in such a binder hinders the development of an electrical field across the dispersed liquid crystal material. Additionally, ions in the binder can migrate in the presence of an electrical field, chemically damaging the light modulating layer. The liquid crystal and gelatin emulsion are coated to a thickness of between 5 and 30 microns to optimize optical properties of light modulating layer. The coating thickness, size of the liquid crystal domains, and concentration of the domains of liquid crystal materials are designed for optimum optical properties. Heretofore, the dispersion of liquid crystals is performed using shear mills or other mechanical separating means to form domains of liquid crystal within light modulating layer.

The LCD may also include functional layers. In one embodiment of an LCD 10, illustrated in FIG. 1, a transparent, multilayer flexible support 15 is coated with a first conductive layer 20, which may be patterned, onto which is coated the light modulating liquid crystal layer 30. A second conductive layer 40 is applied and may be overcoated with a dielectric layer to which dielectric conductive row contacts are attached, including vias that permit interconnection between conductive layers and the dielectric conductive row contacts. An optional nanopigmented functional layer may be applied between the liquid crystal layer 30 and the second conductive layer 40.

One or more first conductors 20 are formed on display substrate 15. First conductors 20 can be tin-oxide, indium-tin-oxide (ITO), or polythiophene, with ITO being the preferred material. Typically the material of first conductors 20 is sputtered or coated as a layer over display substrate 15 and has a resistance of less than 1000 ohms per square. First conductors 20 can be formed in a conductive layer, for example, by conventional lithographic or laser etching means. Transparent first conductors 20 can also be formed by printing a transparent organic conductor such as PEDT/PSS, PEDOT/PSS polymer, which materials are sold as Baytron (RTM) by Bayer AG Electronic Chemicals.

Cholesteric liquid crystal layer 30 overlays first conductors 20. The cholesteric liquid crystal layer 30 can contain cholesteric liquid crystal material such as those disclosed in U.S. Pat. No. 5,695,682 issued Dec. 9, 1997 to Doane et al., the disclosure of which is incorporated by reference. Such materials are made using highly anisotropic nematic liquid crystal mixtures and adding a chiral doping agent to provide helical twist, in the planes of the liquid crystal, to the point that interference patterns are created that reflect incident light. Application of electrical fields of various intensity and duration can be employed to drive a chiral nematic (cholesteric) liquid crystal material into a reflective state, into near transparent/transmissive state, or into an intermediate state. These materials have the advantage of having first and second optical states that are both stable in the absence of an electrical field. The materials can maintain a given optical state indefinitely after the field is removed. Cholesteric liquid crystal materials can be formed using a two component system such as MDA-00-1444 (undoped nematic) and MDA-00-4042 (nematic with high chiral dopant concentrations) available from E.M. Industries of Hawthorne, N.Y.

In a preferred embodiment, cholesteric liquid crystal layer 30 is a cholesteric liquid crystal material dispersed in gelatin, preferably deionized photographic grade gelatin. For example, the liquid crystal material is mixed at 8% cholesteric liquid crystal in a 5% gelatin aqueous solution. The mixture is dispersed to create an emulsion having 8-10 micrometer diameter domains of the liquid crystal in aqueous suspension. The domains can be formed using the limited coalescence technique described in copending U.S. patent application Ser. No. 09/478,683 filed Jan. 6, 2000 by Stephenson et al. The emulsion can be coated over first conductors 20 on a polyester display substrate 15 and dried to provide an approximately 9-micrometer thick polymer dispersed cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A gel sublayer can be applied over first conductors 20 prior to applying cholesteric layer 30 as disclosed in U.S. Pat. No. 6,423,368 by Stephenson et al.

Figure 2:
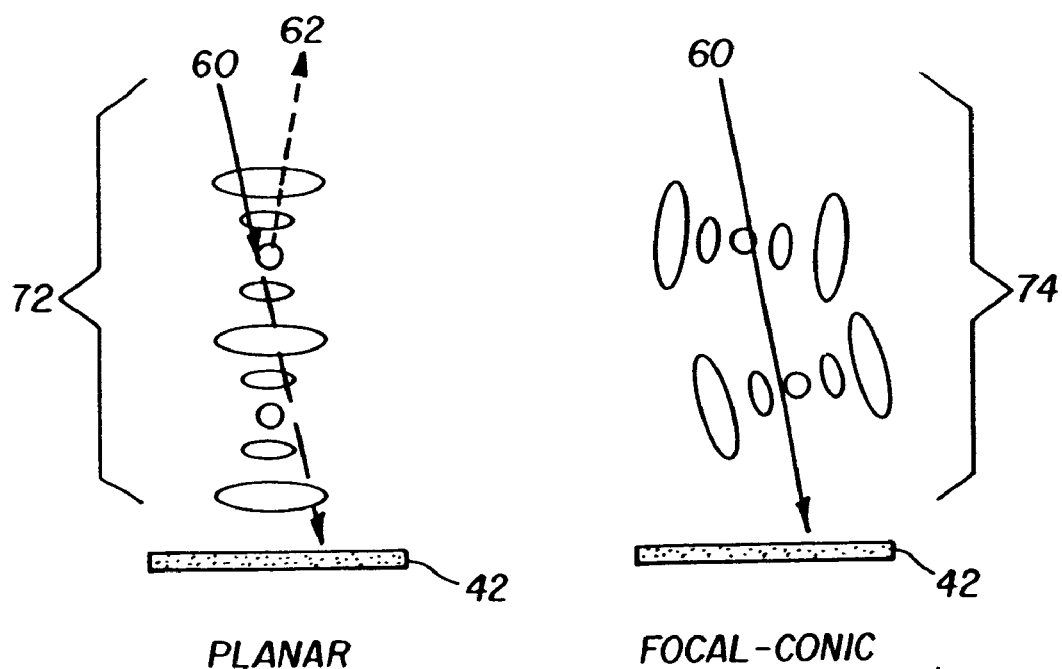
FIG. 2 is a schematic sectional view of a cholesteric ("chiral nematic") liquid crystal material in a planar and focal conic state and responding to incident light consistent with prior art displays.

FIG. 2 is a schematic diagram of a chiral nematic liquid crystal material, respectively, in a planar and focal conic state responding to incident light in accordance with prior art knowledge. In the figure on the left, after a high voltage field has been applied and quickly switched to zero electrical potential, the liquid crystal molecules align as planar liquid crystals 72, which reflect portions of incident light 60 as planar reflective light 62. The chiral dopant concentration defines the peak reflection. The bandwidth around the peak reflection is proportional to the optical birefringence of the nematic liquid crystal. In the figure on the right side of FIG. 2, an application of a lower voltage field causes molecules of the chiral nematic liquid crystal material to break into tilted cells known as focal conic liquid crystals 74. The orientation of the focal conic material is nearly transparent or scattering/transmissive rather than reflective. Changes in the low voltage time duration permits molecules to assume orientations between reflective planar state 72 and the light scattering focal conic state 74.

In the fully evolved focal conic state 74, the cholesteric liquid crystal is light scattering and incident light 60 is forward scattered and can be absorbed by a light absorber 42 to create the appearance of a black (or blackish-dark) image area. Progressive evolution from a planar to focal conic state causes a viewer to perceive a bright planar reflective light 62 that transitions to black as the cholesteric material changes from reflective planar state 72 to a fully evolved light scattering focal conic state 74. When the field is removed, cholesteric liquid crystal layer 30 maintains a given optical state indefinitely. The states are more fully discussed in U.S. Pat. No. 5,437,811 issued Aug. 1, 1995 to Doane et al. Cholesteric materials require light absorber 42 to be highly light absorbing.

Figure 3:
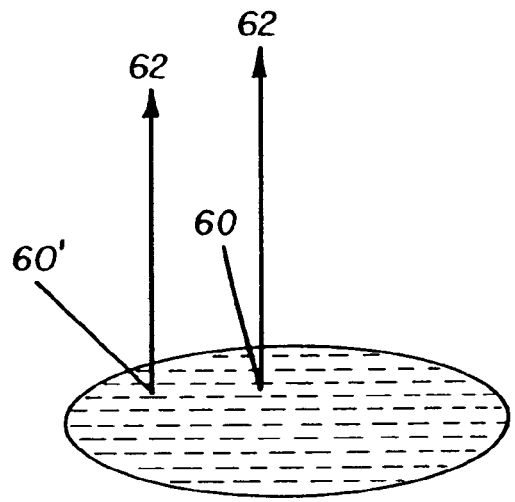
FIG. 3 is a sectional view of a domain containing cholesteric liquid material.

FIG. 3 is a sectional view of a domain containing cholesteric liquid crystal material. Cholesteric liquid crystal material anchors against an arcuate surface. Incident light 60 can strike the domain at oblique angle 60' or a relatively perpendicular angle 60. Light striking cholesteric material at an oblique angle reflects light at a shorter wavelength. The peak reflected wavelength and bandwidth of light is a function of both the cholesteric liquid crystal material properties and domain size and shape.

Figure 4:
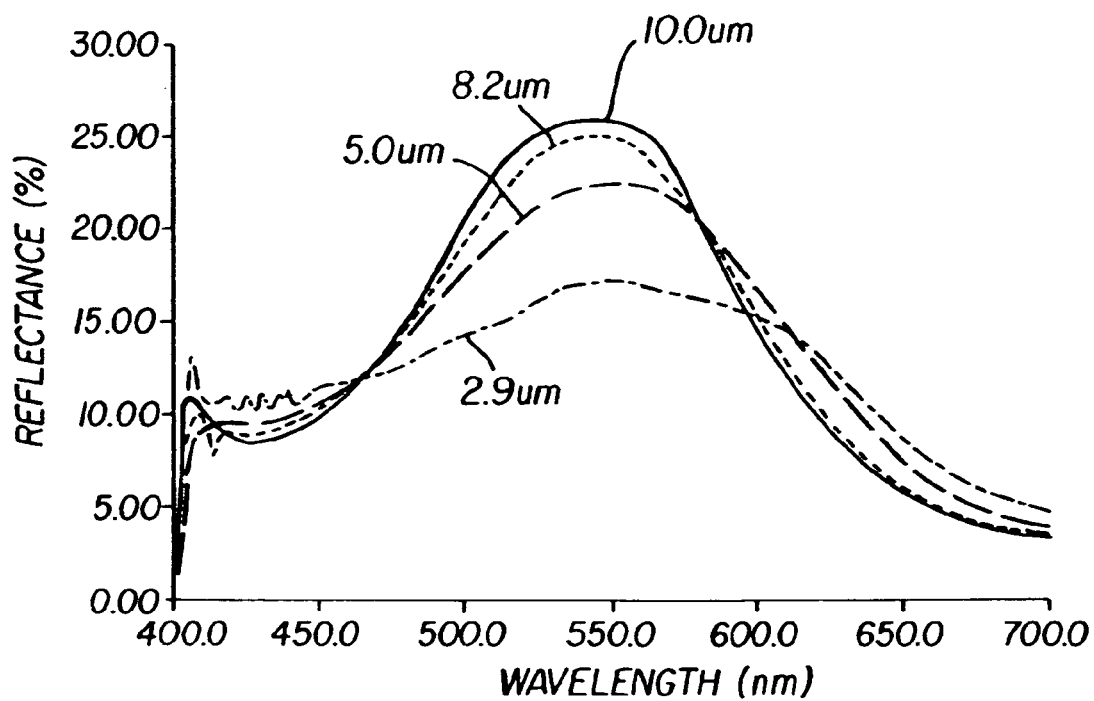
FIG. 4 is a plot of the spectral distribution of polymer dispersed cholesteric liquid crystal with varying domain sizes.

FIG. 4 is a plot of the spectral distribution of polymer dispersed cholesteric liquid crystal with varying domain sizes as measured by a spectrophotometer. The cholesteric liquid crystal measured was Merck BL-118, which has a peak reflection of 550 nanometers when measured between two flat glass slides. The cholesteric liquid crystal material was dispersed in a gelatin-containing water bath, and a constant quantity was coated and dried over ITO conductors. A second conductor was printed over the dried cholesteric coating, and the material was switched into the planar (reflective) state to measure reflectance. Spectral distribution was measured for domains having diameters of 2.9, 5.0, 8.2 and 10.0 micrometers as emulsions. The domains flatten when dried, which have a surface of varying tilt. As domain size increased, the planar reflected light increased. As evident by FIG. 4, the spectral distributions had a 5-nanometer shift in peak reflectance to shorter wavelength due to anchoring of the planar liquid crystal on an arcuate surface reflecting shorter wavelengths of light, which may be taken into account when designing displays. Preferably, the display sheet comprises polymer dispersed cholesteric liquid crystal material with a peak reflected wavelength between 570 and 590 nanometers.

Returning to FIG. 1, complementary light absorbing layer 35 overlays cholesteric liquid crystal material 30. In the preferred embodiment, complementary light absorbing layer 35 is composed of pigments that are milled below 1 micrometer to form "nano-pigments" in a binder. Such pigments are very effective in absorbing wavelengths of light when incorporated into very thin (submicrometer) layers. Such pigments can be selected to be electrically inert to prevent degradation and interference with electrical display fields applied to display 10. Such pigments are disclosed in copending U.S. patent application Ser. No. 10/222,396 filed Aug. 16, 2002, hereby incorporated by reference. The filter layer can comprise two or more differently hued pigments.

In the preferred embodiment, complementary light absorbing layer 35 absorbs the majority of light normally reflected by liquid crystals in the planar state and transmits a portion of light not reflected by cholesteric liquid crystal layer 30. Complementary light absorbing layer 35 should be as thin as possible to minimize drive voltage while providing an acceptable degree of light absorption. Pigments are extremely efficient light absorbers and ideally suited for this purpose. In the preferred embodiment, cholesteric liquid crystal layer 30 is between 4 and 10 micrometers thick. The state-changing field for cholesteric liquid crystal materials is typically 10 volts per micrometer coating thickness. Because complementary light absorbing layer 35 is disposed between the two field carrying conductors, the layer should be significantly thinner than the cholesteric liquid crystal layer 30. In practice, complementary light absorbing layer 35 should be less than about 1 micrometers, preferably 0.5 micrometers or less in thickness. The amount of binder in complementary light absorbing layer 35 should also be low to minimize any increase in drive voltage. It was found that a gelatin binder at a 1:1 ratio with the pigment can provide a layer with good bond strength to subsequently applied layers and minimize increases in drive voltage.

In the present invention, complementary light absorbing layer 35 is coated over cholesteric liquid crystal layer 30 to provide a light absorbing layer 35 that provides a high contrast dark image area in the focal conic state relative to planar reflective light. Complementary light absorbing layer 35 further provides in the planar state (via selective transmission of light that can be reflected by an underlying reflective surface) a predesigned amount of light at wavelengths not operated on by the cholesteric liquid crystal. The complementary light absorbing layer 35 can be coated simultaneously with the deposition of cholesteric liquid crystal layer 30 or in a separate step. In a preferred embodiment, multilayer coating equipment such as used in making photographic imaging elements provides cholesteric liquid crystal layer 30 and complementary light absorbing layer 35 as two co-deposited layers. Complementary light absorbing layer 35 is significantly thinner than cholesteric layer 30 and, therefore, as mentioned above, has minimal effect on the electrical field strength required to change the state of the cholesteric liquid crystal material in the manufactured display.

Continuing to refer to the embodiment of FIG. 1, second conductors 40 overlay complementary light absorbing layer 35. Second conductors 40 have sufficient conductivity to induce an electric field across cholesteric liquid crystal layer 30, which field is strong enough to change the optical state of the polymeric dispersed liquid crystal material. Second conductors 40 are formed by screen printing a reflective and conductive formulation such as UVAG (RTM) 0010 material from Allied Photochemical of Kimball, Mich. Such screen printable conductive materials comprise finely divided silver in an ultraviolet curable resin. Care must be taken to create a layer of conductive paste thin enough to permit full radiation hardening of the printed layer. Specification from Allied Photochemical suggested that the UVAG paste should be printed toe a thickness of less than 25 microns to permit full curing of the unhardened paste. It is of further advantage that the layer be as thin as possible to reduce the material cost of manufacture and to maximize the flexibility of the display.

The as-printed silver paste is nonconductive. After printing, when the material is exposed to ultraviolet radiation greater than 0.40 Joules/cm², the resin will polymerize rapidly to form a durable surface. Displays are passed under a high intensity lamp at a speed that will fully cure the paste into the conductive state. Screen printing is preferred to minimize the cost of manufacturing the display.

Providing a sufficient amount of polymer to pigment in complementary light absorbing layer 35 creates a printable surface on second conductors 40. Alternatively, second conductors 40 can be formed by screen printing thermally cured silver-bearing resins. An example of such a material is Acheson Electrodagâ 461 SS, a heat cured silver ink. The heat cured inks require significantly longer cure time than the ultraviolet cured inks and contain volatile solvent that can affect other layers in the display. The first and second conductors can be patterned to produce an addressable matrix.

Figure 7:
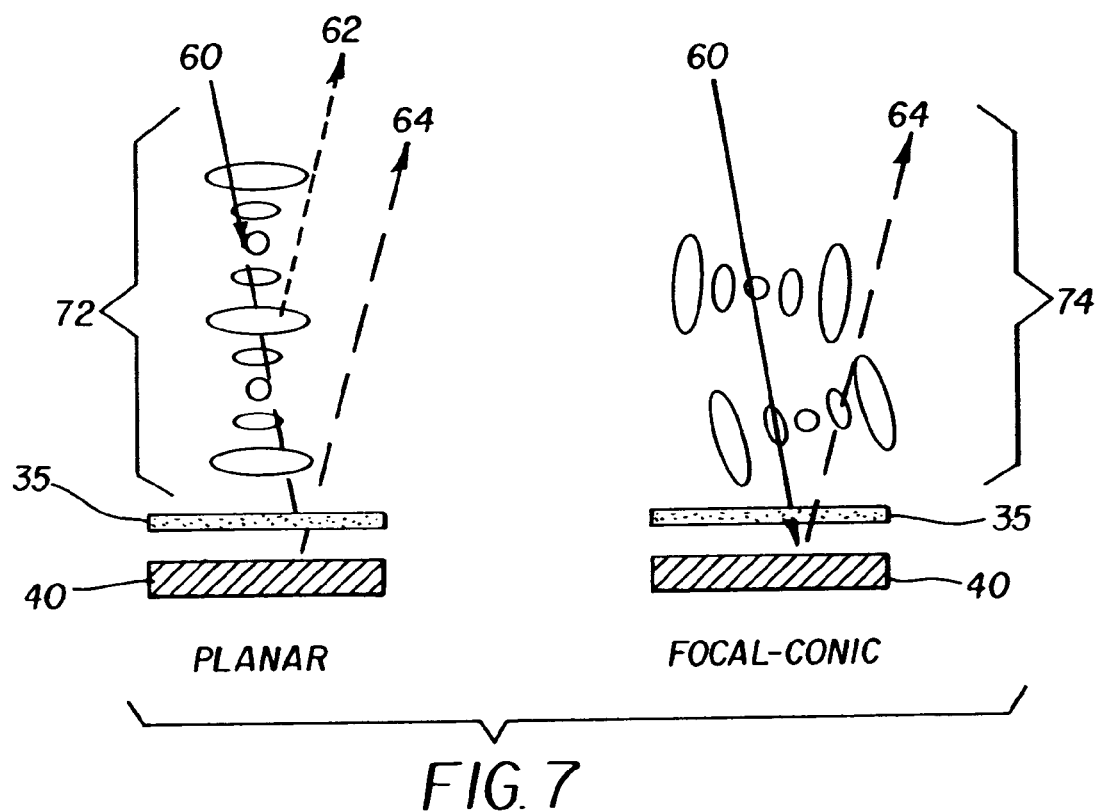
FIG. 7 is a schematic sectional view of optical states of a display in accordance with the present invention.

FIG. 7 is a schematic section view of optical states of a display in accordance with the present invention. The left diagram demonstrates the optical path when the cholesteric liquid crystal material is in the planar state. Incident light 60 strikes planar liquid crystal 72 that reflects a portion of the incident light 60 as planar reflective light 62. The remaining light passes through complementary light absorbing layer 35. A portion of the light passing though complementary light absorbing layer 35 is absorbed, and the remaining light strikes reflective second conductor 40. Light is reflected from second conductor 40, passes through complementary light absorbing layer 35 a second time, and then passes through planar liquid crystal material 72 to become complementary light 64. On the right side of FIG. 7, the liquid crystal material is in the focal conic state and complementary light absorbing layer 35 absorbs wavelengths of light reflected in planar state 72. Light outside cholesteric liquid crystal substantially reflective wavelengths continues to provide complementary light 64 when the liquid crystal material is in focal conic 74.

In the case that complementary light is not required in the application, light absorbing layer 35 can be formed of material completely blocking reflective light. Such pigments are disclosed in U.S. patent application Ser. No. 10/222,396, hereby incorporated by reference. In the case of a display without complementary light 64, light absorbing layer 35 permits the activation of cholesteric material using reflective second conductors 40. Light absorbing layer 35 furthermore permits reflective second conductors 40 to be formed using ultraviolet curable silver materials.

Figure 8:
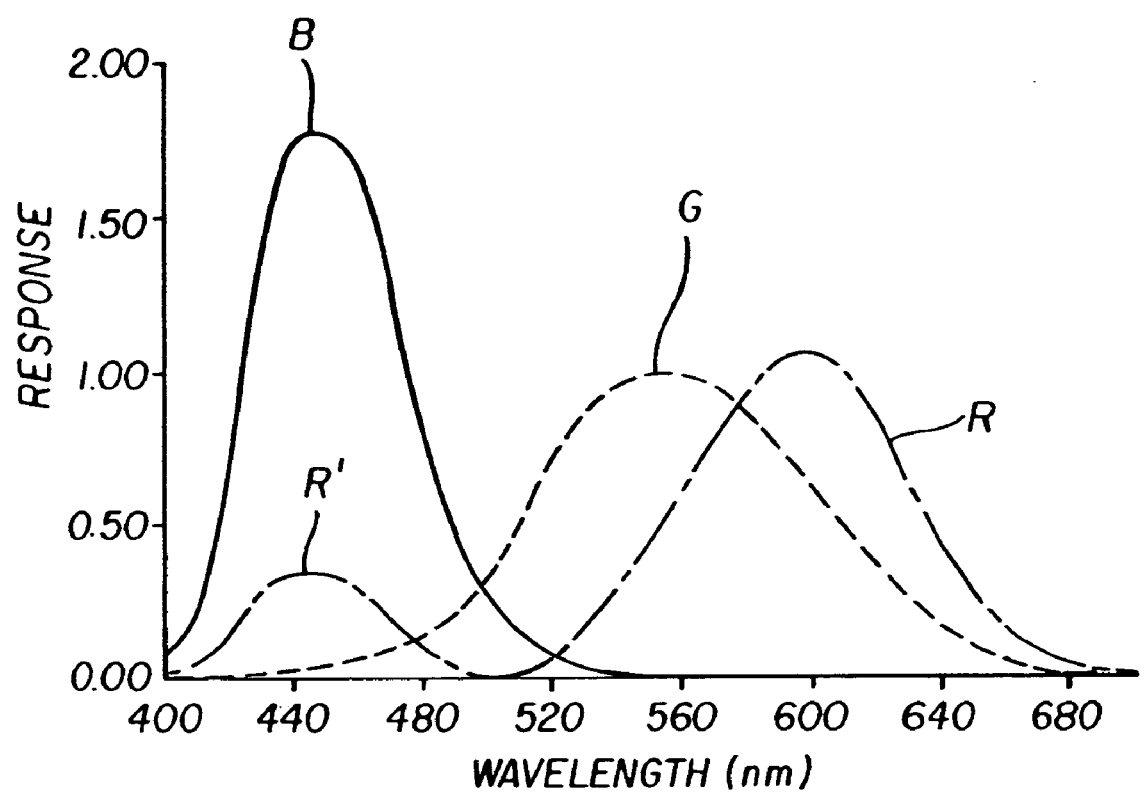
FIG. 8 is a the 1931 CIE color matching function of the human eye.

FIG. 8 is a plot of the response of the three color "channels" (red, green and blue) of the human eye, the "channels" referring to the different types of photoreceptors (cones) contained in the retina of the human eye. The plot is taken from the 1931 CIE Standard Colorimetric observer. Light reflected from display accordingly to the present invention optimally has about equal excitation (area under the curve) of all three color channels and, therefore, appears neutral (white/grey). Cholesteric liquid crystals have about a 100 nanometer bandwidth. It is preferable to select a peak wavelength in that region to maximize brightness. The peak wavelength that has the greatest excitation for such a bandwidth is at approximately 580 nanometers. At that wavelength, excitation of the green (G) and red (R) receptors overlap and are commonly excited by light at wavelengths between 530 and 630 nanometers.

Figure 9:
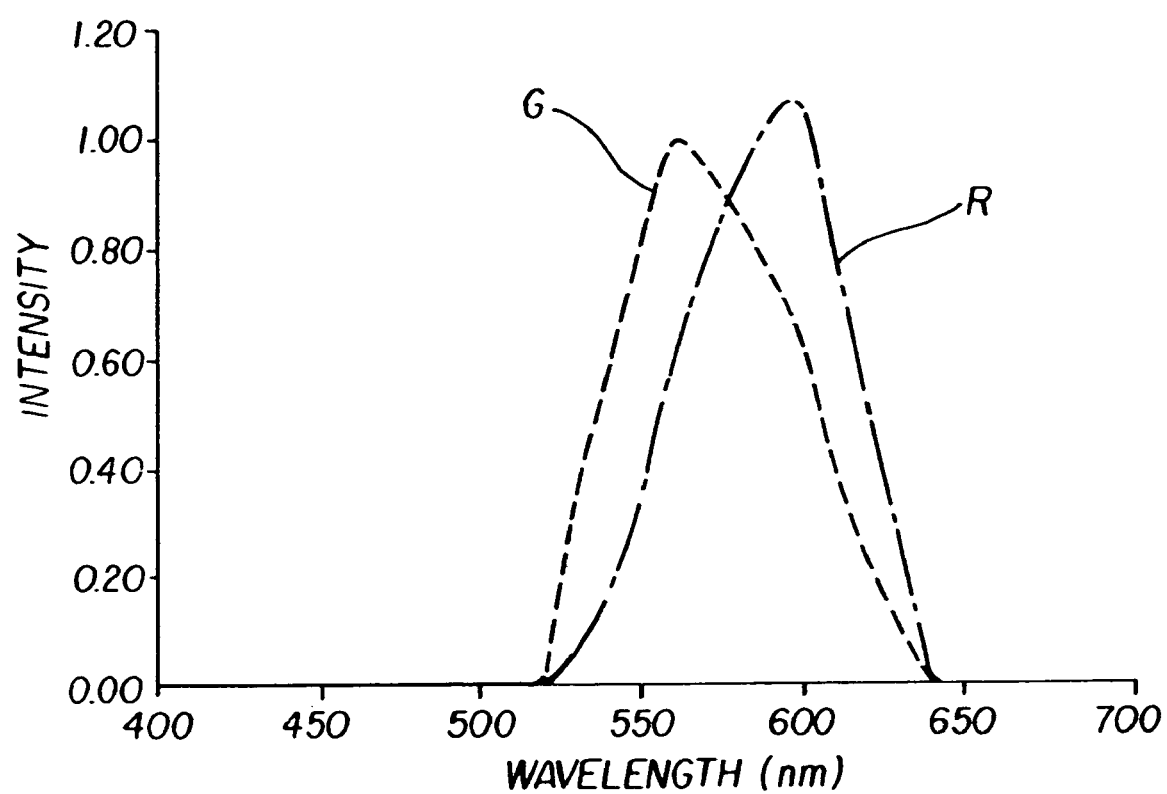
FIG. 9 is a plot of the human eye response to a theoretical cholesteric liquid crystal having a peak reflection of 582 nanometers.

FIG. 9 is a plot of the human eye response to a cholesteric liquid crystal having a peak reflection of 582 nanometers and a 100-nanometer bandwidth. The excitation of the green and red channels, as expressed by the area under the green (G) and red (R) curves is about equal. If an equal area of blue light is presented to a viewer, then the total light will have a neutral (white/grey) hue.

Figure 10:
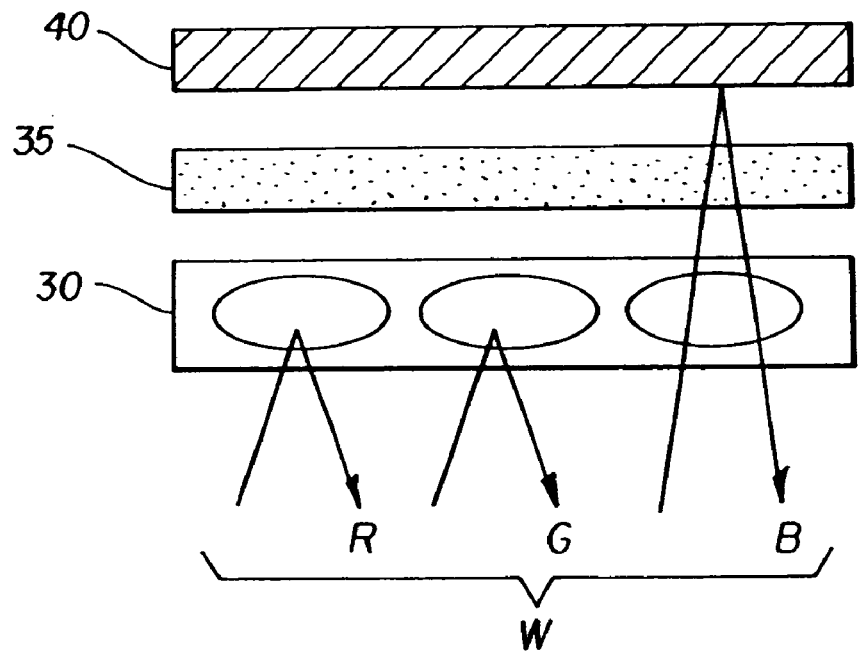
FIG. 10 is the optical response of a display sheet in the planar state in accordance to the present invention.

FIG. 10 is the optical response of one embodiment of a display sheet in the planar state in accordance with one embodiment of the present invention. The peak reflection of the planar state of the liquid crystal is set so that light exciting both green (G) and red (R) portions of the visual spectrum are excited. Complementary light absorbing layer 35 can be a coating comprising one or more pigments/dyes that is designed to reflect a portion of blue (B) light to create light that yields a substantially neutral or whitish color (W). When the liquid crystal material is in the planar state, the total reflected light, accordingly, comprises both (1) the liquid crystal-derived reflected light and (2) the light transmitted by the light absorbing layer and reflected by the reflective surface. The latte reflected light can also be referred to as the color-filtered second reflected light, since the light absorbing layer functions as a color filter.

Figure 11:
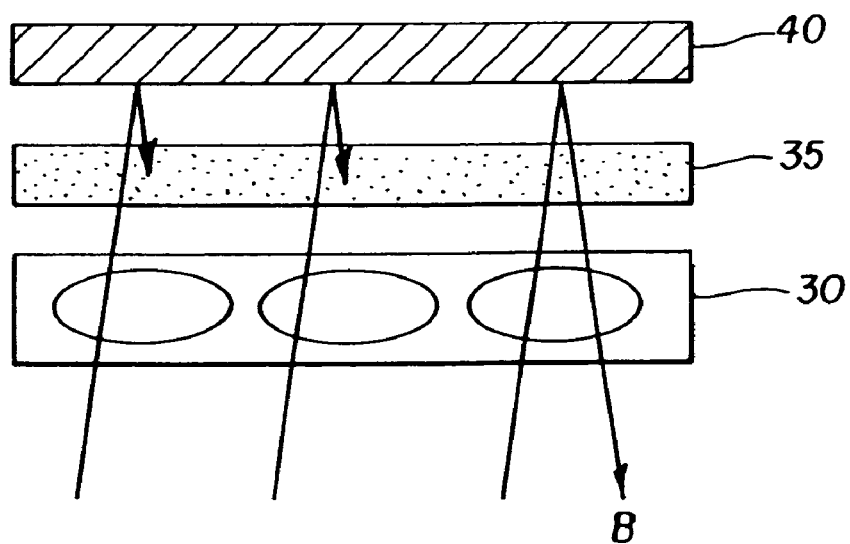
FIG. 11 is the optical response of the display sheet of FIG. 8 in the focal conic state.

FIG. 11 is the optical response of the display sheet of FIG. 10 when the liquid crystal is in the focal conic state. Complementary light absorbing layer 35 absorbs substantial amounts of light of wavelengths of light, in this case red (R) and green (G), reflected in the planar state. A portion of the blue (B) light is reflected to create a blue or bluish image layer. The display thereby can switch between a neutral and dark blue state by electrically switching a cholesteric liquid crystal material between the planar and focal conic state.

Figure 12:
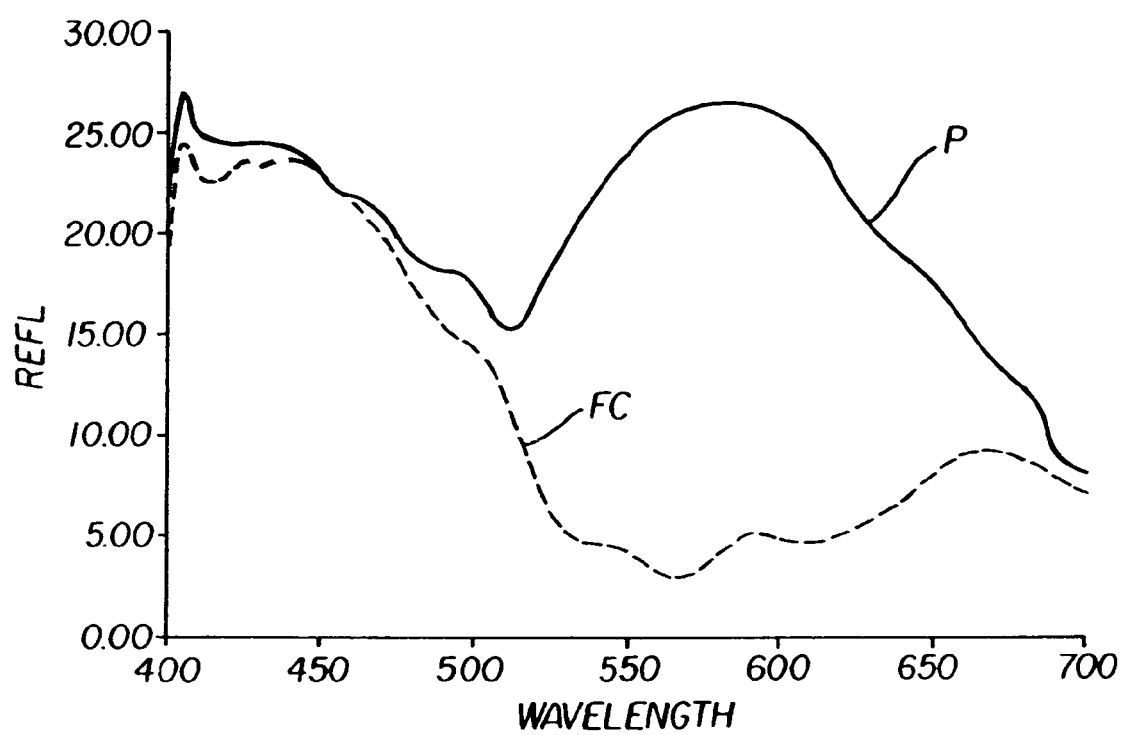
FIG. 12 is a plot of the reflection of light from one embodiment of a display sheet, when tested, according to the present invention.

FIG. 12 is a plot of the reflection of light from a test sheet for a display according to the present invention. In the planar state (P), the peak planar reflected light at 575 nanometers matched the reflected blue light from the complementary light absorbing layer. When the test sheet was written into the focal conic (FC) state the cholesteric liquid crystal material is near transparent/transmissive, and the FC spectrum is a functional plot of the complementary light absorbing layer working in combination with the printed silver reflector. The complementary light absorbing layer is composed of cyan and magenta pigments which together have a high absorption of light in the spectrum reflected when the cholesteric liquid crystal material is in the planar state. The magenta pigment, Pigment Violet 29 has a peak absorption at about 540 nanometers, and the cyan pigment, Sunfast Blue 15:4 has a peak absorption at 620 nanometers. It can be seen in FIG. 10 that the combination of the two pigments provides 95% light absorption from 525- to 635-nanometer wavelengths. The pigments have very high absorption in the areas that overlap, and peak at about 575 nanometers. The peak of reflected light, 25%, occurs in the blue region at about 450 nanometers to balance light reflected in the green and red portions of the visible spectrum. Portions of the visible spectrum not operated on by the cholesteric liquid crystal material, in this case the blue portion, are constant reflectance regardless of the state of the cholesteric liquid crystal material.

Returning to FIG. 10, a component of short wavelength light, or blue (B) light, is added by the combination of complementary light absorbing layer 35 and reflective second conductor 40. Referring to FIG. 8, it can be seen that the addition of the short wavelength blue (B) light further excites red (R') receptors, increasing apparent red (R) color channel excitation. The peak wavelength of the cholesteric liquid crystal material may, therefore, be adjusted to a shorter wavelength to increase the green light and decrease the red light, so that an effectively neutral display is created in the planar state with the addition of the blue light. The blue light component should approximately or substantially match the perceived intensity of the green and red components of light and provide a small amount of excitation to balance the red against the superior green intensity. Pigments suitable for the application are imperfect, and the final formulation for the various components is established by trial and the use of mathematical models.

In a preferred embodiment, reflected light from the display sheet when the imaging layer is in the first relatively higher reflection state has CIE tristimulus values X, Y and Z that are within 20 percent of each other. It is also preferred that when the liquid crystal material is in the planar state, the total reflected light from the display sheet has CIE tristimulus values X, Y and Z that are 20 percent closer to each other than the CIE tristimulus values of the liquid crystal-derived light alone without the color-filtered second reflected light. The X, Y, and Z values can be approximated based on measurements made on a tristimulus colorimeter R, G, B measurements, as will be understood by the skilled artisan.

Displays can be made according to the present invention to comprise contrasting colors other than blue-neutral or blue-whitish, as will be understood by the skilled artisan. For example, magenta-white, red-white, and yellow-white combinations can be obtained, wherein the high reflectance state is "white" or whitish, meaning bright and substantially neutral and by the nonwhite colors is meant a darker tinted color. The peak wavelength of the cholesteric liquid crystal material can be changed to provide selective reflection and transmission in other areas of the visible spectrum. For example, the peak wavelength can be adjusted to reflect only in the blue-green or intermediate wavelengths between the two colors. The cholesteric liquid crystal material can be set to reflect primarily red light. In each case, complementary light absorbing materials can be selected to provide high absorption in the wavelengths reflected in the planar state, and invariant portions for other wavelengths. In certain cases, the display can provide two contrasting colors/states neither of which are neutral. Usually in practice, however, it is preferable to have a neutral state that is as bright as possible. A cholesteric liquid crystal material near 580 nanometers with a complementary blue pigment and a reflective second conductor provides a comparatively bright neutral contrast.

Processes can be used to create displays with complementary light absorbing layers and reflective conductors using rigid substrates or multiple substrates. Displays can be built using this invention with a substrate moved to behind the reflective second conductor.

EXAMPLES

Example 1

Standard UVAG 0010 silver paste was printed over light absorbing layer 35 using a polyester screen mesh. The mesh was formed of Sefar PECAP LE 7-305-34 from Sefar America MEC Division of Lumbarton, N.J., having 305 threads per inch, each thread having a diameter of 34 microns. A photosensitive emulsion was applied to the mesh and hardened using a photomask. Masked, unhardened emulsion was removed in areas corresponding to second conductors 40. When a silver paste was printed through the mesh, the paste created 16 micron thick second conductors 40.

Figure 5:
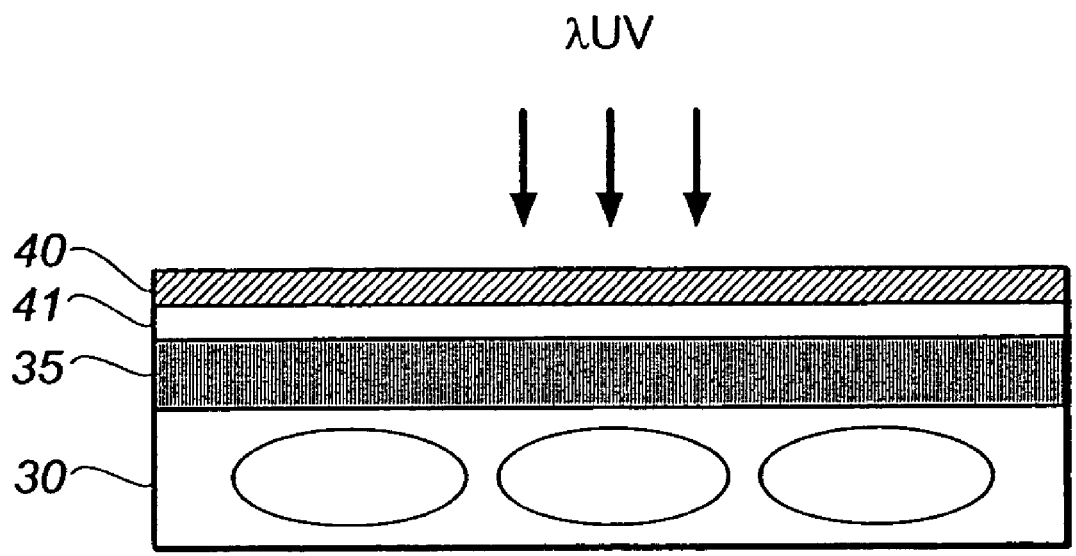
FIG. 5 is a side section of a display in accordance with the present invention having nonconductive areas in a printed second conductor.

FIG. 5 is a side section of a display in accordance with the present invention having nonconductive areas in a printed second conductor. Displays formed using the screen and coated at that thickness had darker mottling in areas written in the planar state. A nonconductive uncured area 41 in layer 40 even a few microns thick will reduce the effective field strength applied to cholesteric materials. It was hypothesized that the silver had not cured in those areas, and that the nonconductive uncured areas reduced the field strength of an applied field that prevented the cholesteric material form being driven fully into the planar state. However, ultraviolet radiation sufficient to fully cure the printed silver second conductor damages the cholesteric material.

Example 2

Figure 6:
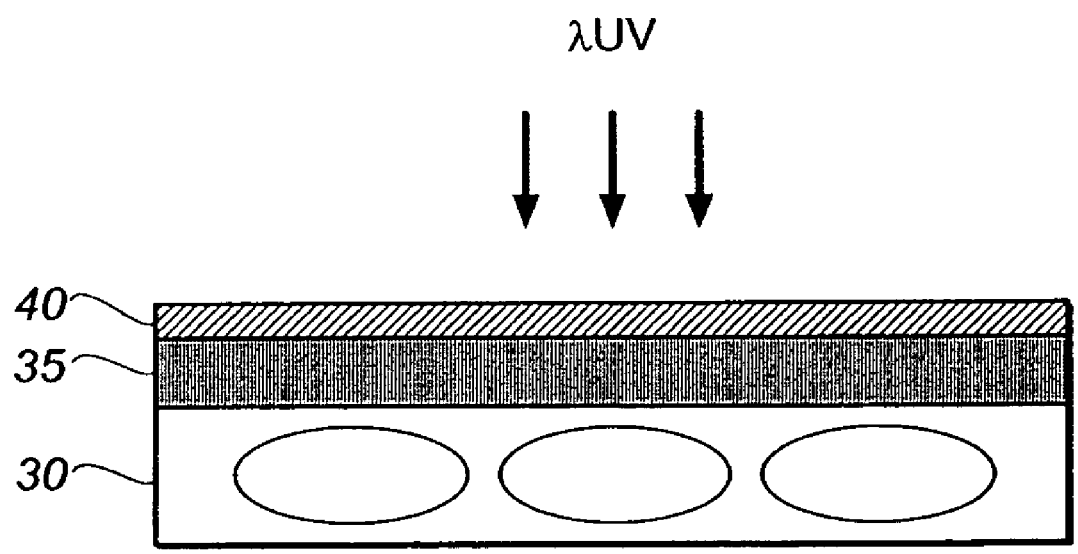
FIG. 6 is a side section view of a display in accordance with the present invention having fully cured printed second conductors.

FIG. 6 is a side section view of a display in accordance with the present invention having fully cured printed second conductors. In a second experiment a new screen, Sefar 7-355-34 mesh, was used to create displays having an 11 microns thick second conductors 40. Second conductors 40 were formed using UVAG 0010 paste having SF1 silver flake. The UVAG 10 w/SF1 was a combination of silver flake and silver particles with a maximum particle size smaller than the standard UVAG 0010 material. It is believed that the small particle size permits both uniform ink deposition and penetration of the ultraviolet cure energy. The resulting displays had no mottling in areas written into the planar state. The thinner silver layer with finer silver particles permitted ultraviolet radiation curing through the printed silver ink. It is believed that in the case of conformal second conductors 40 using ultraviolet curable resins and silver, that the paste must be thinner than the 25 micron thickness acceptable in other applications. Layers significantly below the original 16 micron layer thickness, in a preferred case 11 microns, permit complete curing of the paste and prevents a nonconductive uncured layer 41 from existing between conductive material and the remainder of the display. Providing a sufficient amount of polymer to pigment in complementary light absorbing layer 35 creates a printable surface on second conductors 40.

Example 3

An experiment was conducted to create a sheet in accordance to the present invention. The sheet was constructed using 300 ohm per square ITO over a 150 micrometer thick polyester sheet. A polymer dispersed liquid crystal cholesteric material in accordance with the previously described formulation was blended to have a peak wavelength of 575 nanometers. The cholesteric liquid crystal material was dispersed in 8.3 micron domains and coated over the ITO conductor.

A complementary pigment solution was made having 1.74% dissolved gelatin, 0.74% Sunfast Blue 15:4 milled to a 110 nanometer mean diameter and 0.1.55% Pigment Violet 29 milled to a 210 nanometer mean diameter. The solution was coated over the polymer dispersed cholesteric liquid crystal at 10.76 grams per square meter and dried to form a complementary light absorbing layer. The dried layer was less than 0.5 microns thick. Second conductors were printed with 11 microns thick UVAG 0010 paste having SF1 silver flake over the complementary light absorbing layer. After printing, the resinous material was exposed to ultraviolet radiation greater than 0.40 Joules/cm$^2$ to form a durable surface. The resulting displays written in the planar state were free of mottle.

Prior experiments had determined that polymer dispersed cholesteric liquid crystal material in the experimental formulation reflected approximately 25% of light at 575 nanometers when the material was in the planar state. The effective reflectivity of the printed silver was found to be uniformly 65 percent across the visible spectrum. The dye concentration was selected so that the passage of light through the complementary light absorbing layer, reflected by the printed silver second conductor and back through the complementary light absorbing layer would have approximately 25% reflected blue light, as measured at the peak reflected wavelength of 450 nanometers.

FIG. 12 is a plot of the reflection of light from a test sheet for a display according to the present invention. In the planar state (P), the peak planar reflected light at 575 nanometers matched the reflected blue light from the complementary light absorbing layer. When the test sheet was written into the focal conic (FC) state the cholesteric liquid crystal material is near transparent/transmissive, and the FC spectrum is a functional plot of the complementary light absorbing layer working in combination with the printed silver reflector. The complementary light absorbing layer is composed of cyan and magenta pigments which together have a high absorption of light in the spectrum reflected when the cholesteric liquid crystal material is in the planar state. The magenta pigment, Pigment Violet 29 has a peak absorption at about 540 nanometers, and the cyan pigment, Sunfast Blue 15:4 has a peak absorption at 620 nanometers. It can be seen in FIG. 10 that the combination of the two pigments provides 95% light absorption from 525- to 635-nanometer wavelengths. The pigments have very high absorption in the areas that overlap, and peak at about 575 nanometers. The peak of reflected light, 25%, occurs in the blue region at about 450 nanometers to balance light reflected in the green and red portions of the visible spectrum. Portions of the visible spectrum not operated on by the cholesteric liquid crystal material, in this case the blue portion, are constant reflectance regardless of the state of the cholesteric liquid crystal material.

Figure 13:
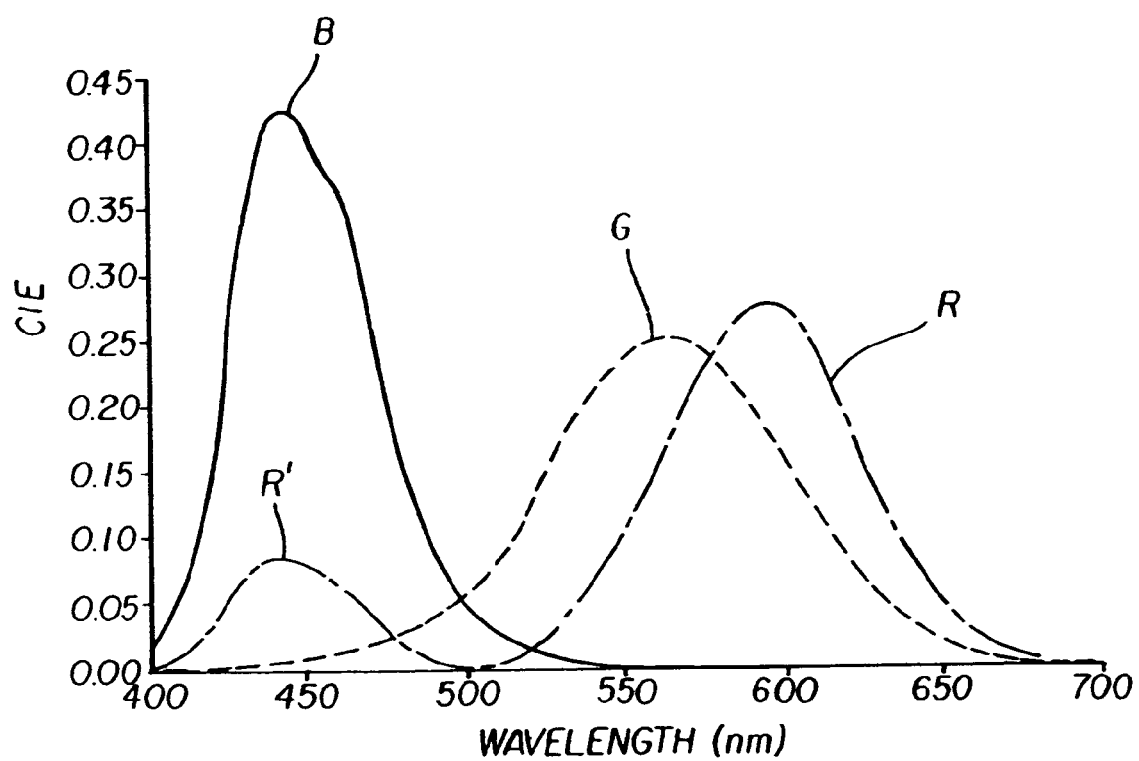
FIG. 13 is a plot of the red, green and blue components of the display sheet of FIG. 12 in the planar state.

FIG. 13 is a plot of the red, green and blue components of the sheet of FIG. 12 in the planar state, as perceived by the human eye. The areas under each color curve were approximately equal for all three color channels, and the sheet, therefore, had a neutral, light gray appearance. When the test sheet was written into the focal conic state, the material appeared to be a light blue. The visible difference between the two states was pleasing.

The invention can be practiced substituting materials and processes different from those used to generate the test sheet. Evaporated metals can be used in place of the printed silver. Displays are improved by using higher reflecting materials such as aluminum. The complementary pigments used in the test sheet can be replaced by one or more combinations of pigments or dyes to provide higher absorption of light in the planar reflective wavelengths while maintaining a constant blue reflection.

The invention has been described in detail with particular reference to certain preferred embodiments thereof, but it will be understood that variations and modifications can be effected within the spirit and scope of the invention.

The invention claimed is:

1. A display device comprising a substrate, at least one UV curable, reflective conductive layer and a cholesteric liquid crystal light modulating layer, wherein said at least one UV curable reflective conductive layer is a silver based layer, and wherein said silver based layer is thinner than 11 microns.

2. The display device of claim 1 wherein said substrate is flexible.

3. The display device of claim 1 wherein said substrate is glass or plastic.

4. The display device of claim 1 wherein said substrate is transparent.

5. The display device of claim 1 wherein said substrate comprises at least one member selected from the group consisting of polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene) fluoropolymer (PETFE), and poly(methyl methacrylate) acrylate/methacrylate copolymers (PMMA).

6. The display device of claim 1 wherein said substrate comprises polyethylene terephthalate (PET).

7. The display device of claim 1 wherein said substrate comprises polyethylene naphthalate (PEN).

8. The display device of claim 1 wherein said substrate comprises polyester.

9. The display device of claim 1 wherein said substrate comprises polyimide.

10. The display device of claim 1 wherein said substrate comprises cellulose acetate.

11. The display device of claim 1 wherein said substrate comprises aliphatic polyolefin.

12. The display device of claim 11 wherein said aliphatic polyolefin comprises high density polyethylene (HDPE), low density polyethylene (LDPE), polypropylene, and oriented polypropylene (OPP).

13. The display device of claim 1 wherein said substrate further comprises a hard coating.

14. The display device of claim 1 wherein said at least one UV curable reflective conductive layer is patterned.

15. The display device of claim 1 wherein said at least one UV curable reflective conductive layer further comprises a different element.

16. The display device of claim 15 wherein said different element comprises at least one member selected from the group consisting of aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd).

17. The display device of claim 15 wherein said at least one UV curable reflective conductive layer comprises a gold/silver alloy.

18. The display device of claim 15 wherein said at least one UV curable reflective conductive layer comprises a layer of silver coated on one or both sides with a thinner layer of metal.

19. The display device of claim 1 wherein said at least one UV curable reflective conductive layer is printed.

20. The display device of claim 1 wherein said imageable layer is bistable.

21. The display device of claim 1 wherein said cholesteric liquid crystal light modulating layer is a polymer dispersed cholesteric liquid crystal light modulating layer.

22. The display device of claim 1 further comprising at least one functional layer.

23. The display device of claim 22 wherein said at least one functional layer is a dielectric layer.

24. The display device of claim 23 further comprising dielectric conductive row contacts.

25. The display device of claim 24 further comprising vias that permit interconnection between conductive layers and the dielectric conductive row contacts.

26. The display device of claim 22 wherein said at least one functional layer is a color contrast layer.

27. The display device of claim 26 wherein said color contrast layer comprises a nano-pigmented layer.

28. The display device of claim 22 wherein said at least one functional layer is an antistatic layer.

29. The display device of claim 22 wherein said at least one functional layer is a protective layer.

30. A display device comprising a substrate, a first transparent conductive layer, a cholesteric liquid crystal light modulating layer, and a second conductive layer, wherein said second conductive layer is UV curable and reflective, wherein said second conductive layer is a silver based layer, and wherein said silver based layer is thinner than II microns.

31. The display device of claim 30 wherein said substrate is flexible.

32. The display device of claim 30 wherein said substrate is glass or plastic.

33. The display device of claim 30 wherein said substrate is transparent.

34. The display device of claim 30 wherein said substrate comprises at least one member selected from the group consisting of polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene) fluoropolymer (PETFE), and poly(methyl methacrylate) acrylate/methacrylate copolymers (PMMA).

35. The display device of claim 30 wherein said substrate comprises polyethylene terephthalate (PET).

36. The display device of claim 30 wherein said substrate comprises polyethylene naphthalate (PEN).

37. The display device of claim 30 wherein said substrate comprises polyester.

38. The display device of claim 30 wherein said substrate comprises polyimide.

39. The display device of claim 30 wherein said substrate comprises cellulose acetate.

40. The display device of claim 30 wherein said substrate comprises aliphatic polyolefin.

41. The display device of claim 40 wherein said aliphatic polyolefin comprises high density polyethylene (HDPE), low density polyethylene (LDPE), polypropylene, and oriented polypropylene (OPP).

42. The display device of claim 30 wherein said substrate further comprises a hard coating.

43. The display device of claim 30 wherein said first transparent conductive layer comprises a primary metal oxide.

44. The display device of claim 43 wherein said first transparent conductive layer comprises indium tin oxide.

45. The display device of claim 43 wherein said first transparent conductive layer further comprises at least one secondary metal oxide.

46. The display device of claim 45 wherein at least one secondary metal oxide comprises at least one member selected from the group consisting of indium, titanium, cadmium, gallium-indium, niobium, tin, cerium, zirconium, hafnium or tantalum.

47. The display device of claim 43 wherein said first transparent conductive layer is patterned.

48. The display device of claim 30 wherein said cholesteric liquid crystal light modulating layer is a polymer dispersed cholesteric liquid crystal light modulating layer.

49. The display device of claim 30 wherein said at least one UV curable reflective conductive layer is patterned.

50. The display device of claim 30 wherein said at least one UV curable reflective conductive layer further comprises a different element.

51. The display device of claim 50 wherein said different element comprises at least one member selected from the group consisting of aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd).

52. The display device of claim 50 wherein said at least one UV curable reflective conductive layer comprises a gold/silver alloy.

53. The display device of claim 50 wherein said at least one UV curable reflective conductive layer comprises a layer of silver coated on one or both sides with a thinner layer of metal.

54. The display device of claim 30 wherein said at least one UV curable reflective conductive layer is printed.

55. The display device of claim 30 further comprising at least one functional layer.

56. The display device of claim 55 wherein said at least one functional layer is a dielectric layer.

57. The display device of claim 55 further comprising dielectric conductive row contacts.

58. The display device of claim 57 further comprising vias that permit interconnection between conductive layers and the dielectric conductive row contacts.

59. The display device of claim 55 wherein said at least one functional layer is a color contrast layer.

60. The display device of claim 59 wherein said color contrast layer is reflective.

61. The display device of claim 59 wherein said color contrast layer is a radiation absorbing layer.

62. The display device of claim 61 wherein said radiation absorbing layer is positioned between said light modulating layer and said UV curable reflective conductive layer.

63. The display device of claim 59 wherein said color contrast layer comprises a nano-pigmented layer.

64. The display device of claim 55 wherein said at least one functional layer is an antistatic layer.

65. The display device of claim 55 wherein said at least one functional layer is a protective layer.

* * * * *